United States Patent
Yoshitani

(10) Patent No.: US 8,477,360 B2
(45) Date of Patent: Jul. 2, 2013

(54) IMAGE PROCESSING METHOD, IMAGE PROCESSING APPARATUS AND CONTROL PROGRAM FOR IMAGE PROCESSING APPARATUS

(75) Inventor: Akihiro Yoshitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 11/720,926

(22) PCT Filed: Dec. 13, 2005

(86) PCT No.: PCT/JP2005/023213
§ 371 (c)(1),
(2), (4) Date: Jun. 5, 2007

(87) PCT Pub. No.: WO2006/064942
PCT Pub. Date: Jun. 22, 2006

(65) Prior Publication Data
US 2008/0062457 A1    Mar. 13, 2008

(30) Foreign Application Priority Data
Dec. 13, 2004   (JP) ................................. 2004-359286

(51) Int. Cl.
*G06K 15/00*   (2006.01)
(52) U.S. Cl.
USPC ........................... 358/1.18; 358/1.15; 358/1.1
(58) Field of Classification Search
USPC ........................................ 358/1.18, 1.15, 1.1
See application file for complete search history.

(56) References Cited

U.S. PATENT DOCUMENTS

| 5,161,037 | A | 11/1992 | Saito |
| 5,438,430 | A | 8/1995 | Mackinlay et al. |
| 6,169,596 | B1 * | 1/2001 | Shiota ............................. 355/40 |
| 6,535,298 | B2 | 3/2003 | Winter et al. |
| 6,744,529 | B2 | 6/2004 | Winter et al. |
| 6,956,671 | B2 | 10/2005 | Monty et al. |
| 2001/0040685 | A1 | 11/2001 | Winter et al. |
| 2001/0052993 | A1 * | 12/2001 | Lumley ........................ 358/1.15 |

(Continued)

FOREIGN PATENT DOCUMENTS

| JP | 10-161248 A | 6/1998 |
| JP | 2001-130170 A | 5/2001 |

(Continued)

OTHER PUBLICATIONS

Search Report, dated Oct. 27, 2008, in EP 05 81 6723.

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

In an image processing apparatus having an image reading unit 1 together with an image recording unit, an order sheet A having disposed thereon the thumb-nail image of an image capable of being record-outputted, and an order sheet B having disposed thereon a mark sheet section for designating image data corresponding to the thumb-nail image are record-outputted, the order sheet A and the order sheet B on which a user has effected marking are read by the image reading unit 1, the mark of a mark sheet section in the image on the read order sheet B is analyzed, and on the basis of the analysis, the assigned image data is record-outputted by the image recording unit. With the configuration, a reusable order sheet is provided to thereby enable the waste of resources and time to be saved, and efficient image processing to be carried out.

10 Claims, 8 Drawing Sheets

U.S. PATENT DOCUMENTS

| | | | |
|---|---|---|---|
| 2002/0051201 A1* | 5/2002 | Winter et al. | 358/1.16 |
| 2002/0054328 A1* | 5/2002 | Konishi | 358/1.15 |
| 2004/0134978 A1 | 7/2004 | Hara et al. | |
| 2004/0145770 A1* | 7/2004 | Nakano et al. | 358/1.15 |
| 2004/0174562 A1* | 9/2004 | Edwards | 358/1.18 |
| 2004/0190059 A1 | 9/2004 | Winter et al. | |

FOREIGN PATENT DOCUMENTS

| | | |
|---|---|---|
| JP | 2002305701 | 10/2002 |
| JP | 2004058603 | 2/2004 |
| JP | 2004135122 | 4/2004 |
| JP | 2004-333719 A | 11/2004 |

* cited by examiner

FIG. 2B

```
┌─────────────────────────────────────────────────────────────┐
│  ┌─────────────────────────────────────────────────────┐   │
│  │ PHOTO NAVI SHEET B                                  │   │
│  └─────────────────────────────────────────────────────┘   │
│      (1)           (2)           (3)           (4)          │
│     ⎡ 1 SHEET  ○   1 SHEET  ○   1 SHEET  ○   1 SHEET  ○    │
│  205⎨ 2 SHEETS ○   2 SHEETS ○   2 SHEETS ○   2 SHEETS ○    │
│     ⎣ 3 SHEETS ○   3 SHEETS ○   3 SHEETS ○   3 SHEETS ○    │
│      (5)           (6)           (7)           (8)          │
│       1 SHEET  ○   1 SHEET  ○   1 SHEET  ○   1 SHEET  ○    │
│       2 SHEETS ○   2 SHEETS ○   2 SHEETS ○   2 SHEETS ○    │
│       3 SHEETS ○   3 SHEETS ○   3 SHEETS ○   3 SHEETS ○    │
│      (9)          (10)          (11)          (12)          │
│       1 SHEET  ○   1 SHEET  ○   1 SHEET  ○   1 SHEET  ○    │
│       2 SHEETS ○   2 SHEETS ○   2 SHEETS ○   2 SHEETS ○    │
│       3 SHEETS ○   3 SHEETS ○   3 SHEETS ○   3 SHEETS ○    │
└─────────────────────────────────────────────────────────────┘
```

FIG. 2C

| | | | |
|---|---|---|---|
| PHOTO NAVI SHEET B | | | |
| (1) | (2) | (3) | (4) |
| 205 ⎧ 1 SHEET ● | 1 SHEET ○ | 1 SHEET ○ | 1 SHEET ○ |
| ⎨ 2 SHEETS ○ | 2 SHEETS ○ | 2 SHEETS ○ | 2 SHEETS ○ |
| ⎩ 3 SHEETS ○ | 3 SHEETS ○ | 3 SHEETS ○ | 3 SHEETS ○ |
| (5) | (6) | (7) | (8) |
| 1 SHEET ○ | 1 SHEET ○ | 1 SHEET ○ | 1 SHEET ○ |
| 2 SHEETS ● | 2 SHEETS ○ | 2 SHEETS ○ | 2 SHEETS ○ |
| 3 SHEETS ○ | 3 SHEETS ○ | 3 SHEETS ○ | 3 SHEETS ○ |
| (9) | (10) | (11) | (12) |
| 1 SHEET ○ | 1 SHEET ○ | 1 SHEET ○ | 1 SHEET ○ |
| 2 SHEETS ● | 2 SHEETS ○ | 2 SHEETS ○ | 2 SHEETS ○ |
| 3 SHEETS ○ | 3 SHEETS ○ | 3 SHEETS ○ | 3 SHEETS ○ |

FIG. 6
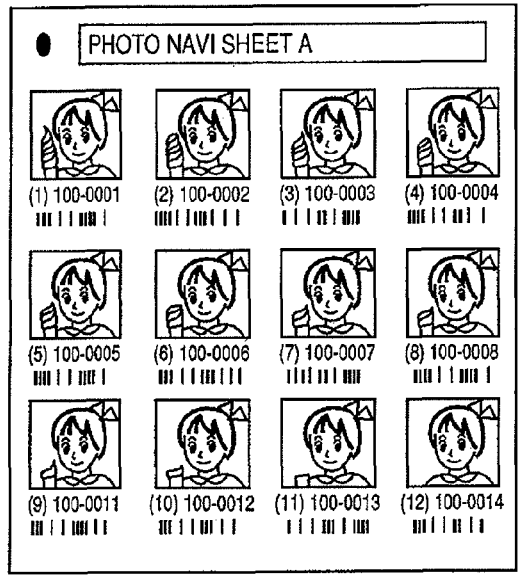
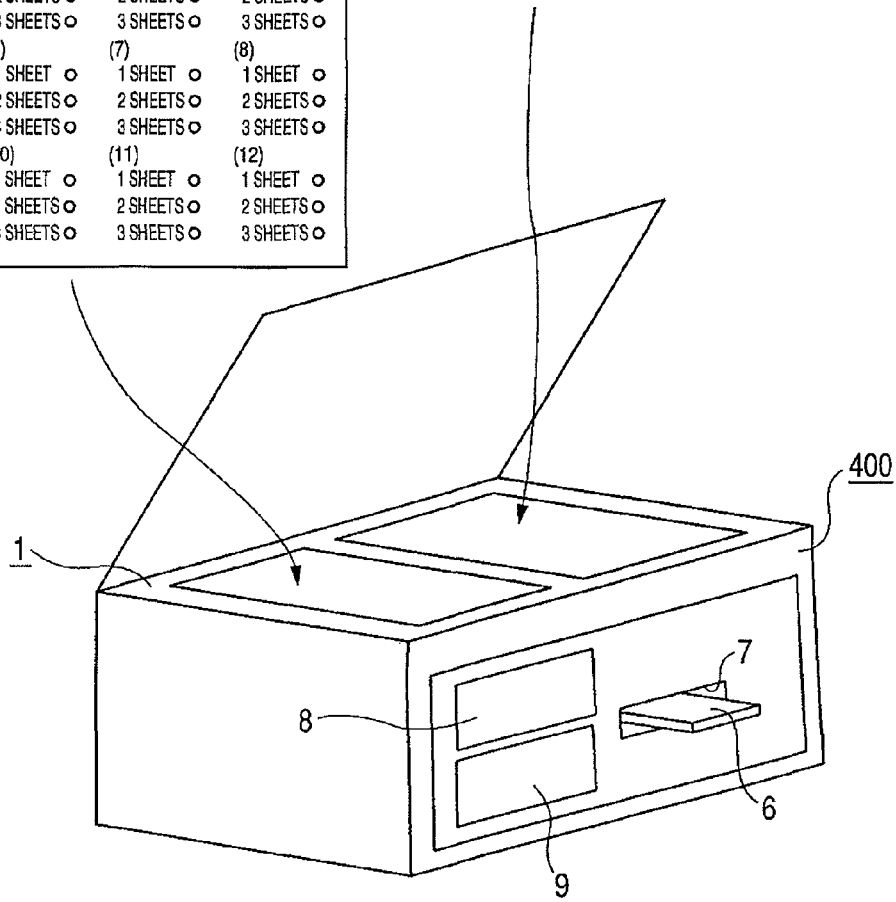

IMAGE PROCESSING METHOD, IMAGE PROCESSING APPARATUS AND CONTROL PROGRAM FOR IMAGE PROCESSING APPARATUS

TECHNICAL FIELD

This invention relates to an image processing method, an image processing apparatus and a control program for an image processing apparatus for assigning image data to be record-outputted by an image recording unit by information described on an order sheet read from an image reading unit.

BACKGROUND ART

In recent years, there have widely spread multifunction printer apparatuses (hereinafter referred to also as MFP) which have an image reading portion (scanner portion) and an image recording portion (printer portion), and can effect copying by a simplex, or can print image data inputted from a digital camera by an apparatus simplex without requiring a host computer or the like.

In such an MFP, and particularly an MFP having a scanner, there is known a mechanism adapted to be capable of designating any image from among a number of image data by a simple operation by the use of a so-called order sheet, and effecting the printing of any number of sheets (for example, Japanese Patent Application Laid-open No. 2002-305701).

Printing using this kind of order sheet is effected by the following procedure.

(1) As shown in FIG. 1 of the accompanying drawings, plural sets of the thumb-nails 102 of the photographed image data of a digital camera recorded on a recording medium mounted on the apparatus, and a mark sheet column 101 which can designate each thumb-nail 102 by a mark form (or further an image ID 103) are arranged side by side, and are printed as an order sheet.

(2) A user effects marking on the mark sheet column 101 of the order sheet by a pencil or the like, and designates which image is to be printed by how many sheets.

(3) The order sheet is read by the scanner of the MFP, and the mark given by the user is recognized by the MFP, to thereby recognize which image data in the recording medium the marked image is, and that image data is printed by the designated number of sheets.

When as shown in FIG. 1, marking (black circle in the mark sheet column 101) has been made, the image of image ID 100-0001, the image of image ID 100-0005 and the image of image ID 100-0011 are printed by one sheet, two sheets and two sheets, respectively.

Such an order sheet as shown in FIG. 1 is difficult to reuse after the user has once effected marking and therefore, is used only once and then thrown away. That is, even when the user desires to print the same photographed image as the last one, it is necessary to print the same order sheet again, and this leads to the waste of resources and time.

Also, in order that the user may choose, and designate an image he wants to print from among all images preserved in the recording medium, it is necessary to print the thumb-nails of all image data in the recording medium as an order sheet, but when the number of images contained in the recording medium is very great, the number of order sheets becomes great in proportion thereto, and this leads to the problem that the waste of resources and time also becomes correspondingly great.

DISCLOSURE OF THE INVENTION

It is the object of the present invention to solve the above-noted problem and to provide an order sheet reusable in an image processing apparatus having an image reading unit and an image recording unit, and enable the waste of resources and time to be saved and efficient image processing to be carried out.

The above-described construction is adapted to discretely print a first order sheet on which thumb-nail images are recorded and a second order sheet having a mark sheet section to be marked by a user, and marking is not effected on the first order sheet. Therefore, this first order sheet can be repetitively reused, only the second order sheet is record-outputted and the second order sheet is simply read together with the first order sheet, whereby image data to be record-outputted can be easily assigned.

BRIEF DESCRIPTION OF THE DRAWINGS

FIG. 2B is an illustration showing the construction of an order sheet B used in the present invention.

FIG. 2C is an illustration showing the order sheet B used in the present invention which has been marked.

FIG. 6 is an illustration showing the disposition of the order sheets A and B onto an image reading portion when the order sheets A and B are to be read by the MFP adopting the present invention.

BEST MODE FOR CARRYING OUT THE INVENTION

There will be shown below an embodiment regarding an MFP into which both of an image reading unit and a printer unit are incorporated.

Embodiment 1

Figure 3:
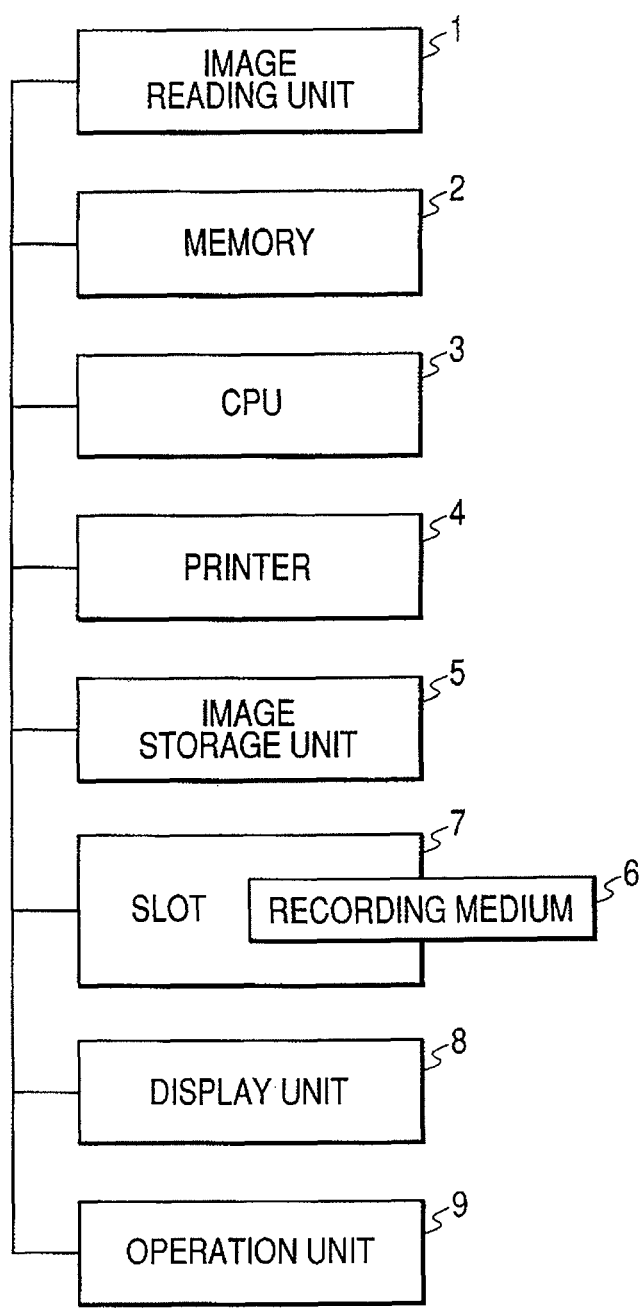
FIG. 3 is a block diagram showing the construction of the control system of an MFP adopting the present invention.

FIG. 3 shows the construction of an MFP adopting the present invention. In FIG. 3, the reference numeral 1 designates an image reading portion (scanner) for scanning an original image and converting it into raster-sequential digital RGB image data, the reference numeral 2 denotes a memory for temporarily storing therein the image data prepared by the image reading portion 1, or storing therein various kinds of information to be handled by a CPU, and the reference numeral 3 designates a CPU for controlling the operation of an entire system.

The reference numeral 4 denotes a printer (image recording unit) for printing the image data prepared by the image reading unit 1 and image data stored in an image storage unit 5 in colors or monochrome. The printer 4 is constructed by the use of a printer engine of an ink jet recording type or an electrophotographic type.

The reference numeral 5 designates an image storage unit which can store therein a number of image data copied from recording media 6. This image storage unit 5 comprises an external storage device such as a hard disk device.

The reference numeral 6 denotes a recording medium which can record digital data thereon. The construction/recording format of the recording medium 6 is arbitrary, and utilization can be made of the standard of a known CF card or SD card. It is preferable that the recording medium 6 be of such a universal type as can be used in common with other device, e.g. a digital camera.

The reference numeral 7 designates a slot for mounting the recording medium 6 therein, and the CPU 3 can effect the reading and writing of the digital image data on the recording medium 6 via this slot 7.

The reference numeral 8 denotes a display unit capable of displaying bit map image data, and the reference numeral 9 designates an operation unit by which a user operates the present apparatus by the use of a cursor key or the like. The units designated by the above-mentioned reference numerals 1 to 9 are connected together by a system bus.

Figure 2A:
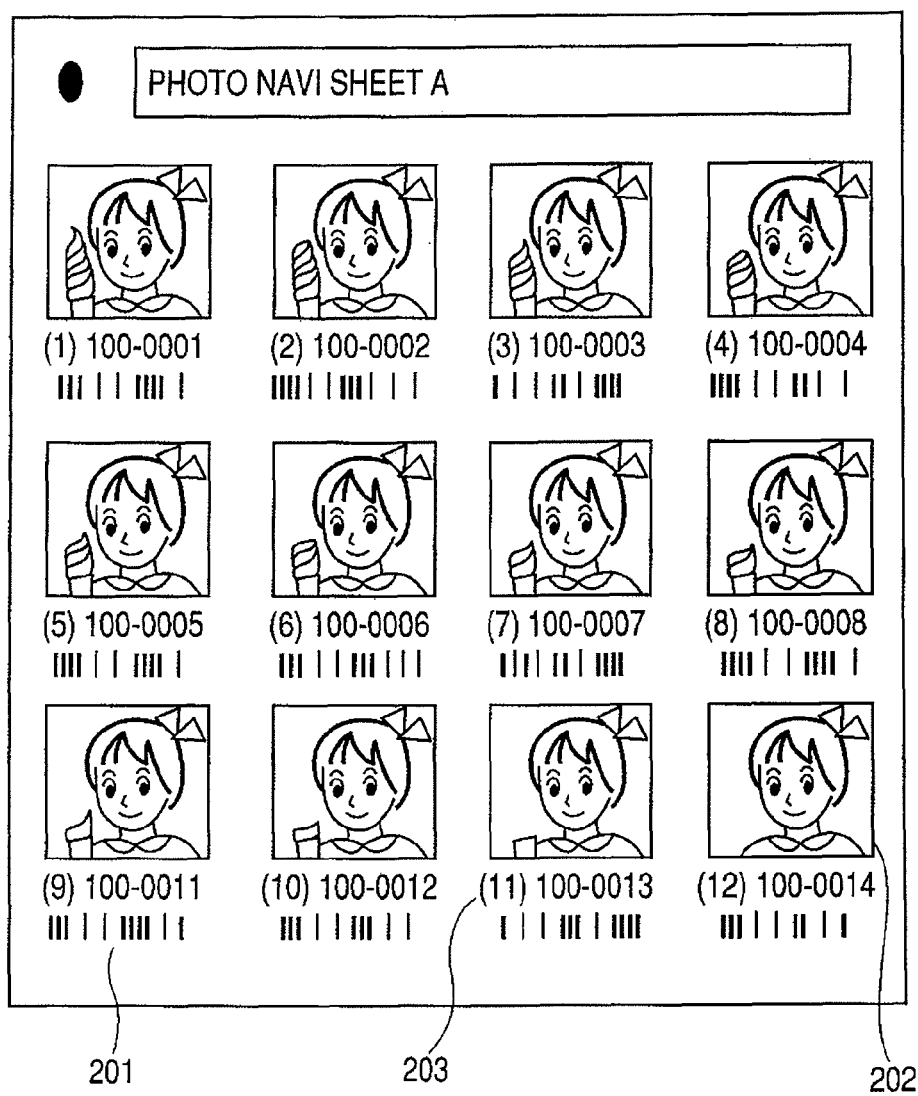
FIG. 2A is an illustration showing the construction of an order sheet A used in the present invention.

In the present embodiment, such order sheets as shown in FIGS. 2A to 2C are used when the image data in the image storage unit 5 (or the recording medium 6) is printed.

FIG. 2A shows an order sheet A for thumb-nail display, and FIG. 2B shows an order sheet B for mark designation.

The order sheet A for thumb-nail display shown in FIG. 2A is given ID bar codes 201 and identification numbers 203 (e.g. readable information of the same contents as the information of ID bar codes) together with the thumb-nail 202 of each image, and is printed in advance in such a format as shown by the printer 4 on the basis of the image data in the image storage unit 5 (or the recording media 6) according to the user's predetermined operation performed through the operation unit 9. The order sheet A for thumb-nail display shown in FIG. 2A, like a conventional one, has printed thereon thumb-nails/ID bar codes/identification numbers for 12 frames of length 3 and breadth 4 in total, but in the case of the present embodiment, it is characterized by the absence of mark sheet sections.

Figure 1:
FIG. 1 is an illustration showing an example of an order sheet used in a conventional MFP.

On the other hand, the order sheet B for mark designation shown in FIG. 2B is print-outputted according to the user's predetermined operation performed through the operation unit 9 (or simultaneously with the printing of the order sheet A for thumb-nail display shown in FIG. 2A). The order sheet B for mark designation is a discrete sheet on which (chiefly) the mark sheet column of a conventional order sheet is made independent. The order sheet B for mark designation shown in FIG. 2B is such that mark sheet sections 205 for the designation of the number of sheets are printed so as to be arranged at locations on the surface of the sheet substantially corresponding to the thumb-nails/ID bar codes/identification numbers for the 12 frames of length 3 and breadth 4 in total of the order sheet A for thumb-nail display. When print designation similar to that in the case of FIG. 1 is to be effected, as shown in FIG. 2C, marking (black circles) is effected on the mark sheet sections 205 of the order sheet B for mark designation by the use of a pencil or the like.

The order sheet A of FIG. 2A and the marked order sheet B of FIG. 2C are read at a time by the image reading unit 1 of the apparatus, whereby the designation of an image the user desires to print can be effected by an operation similar to that for the conventional order sheet.

The order sheet A of FIG. 2A can be preserved and reused after once printed and therefore, the waste of resources and time does not occur when the image included on the same sheet is print-designated next time, and the order sheet B of FIG. 2B does not include thumb-nails and therefore can be printed at any time and by any number of sheets.

Further, in the present embodiment, relating the thumb-nails 202 of the order sheet A to the mark sheet columns 205 of the order sheet B is effected by the positions on the surface of the sheet and therefore, if the printing positions of the thumb-nails/ID bar codes/identification numbers of the order sheet A are determined to one kind, even if the order sheet A (the images thereon) changes, only one kind of order sheet B can be universally used without the format of the order sheet B being changed.

Figure 4:
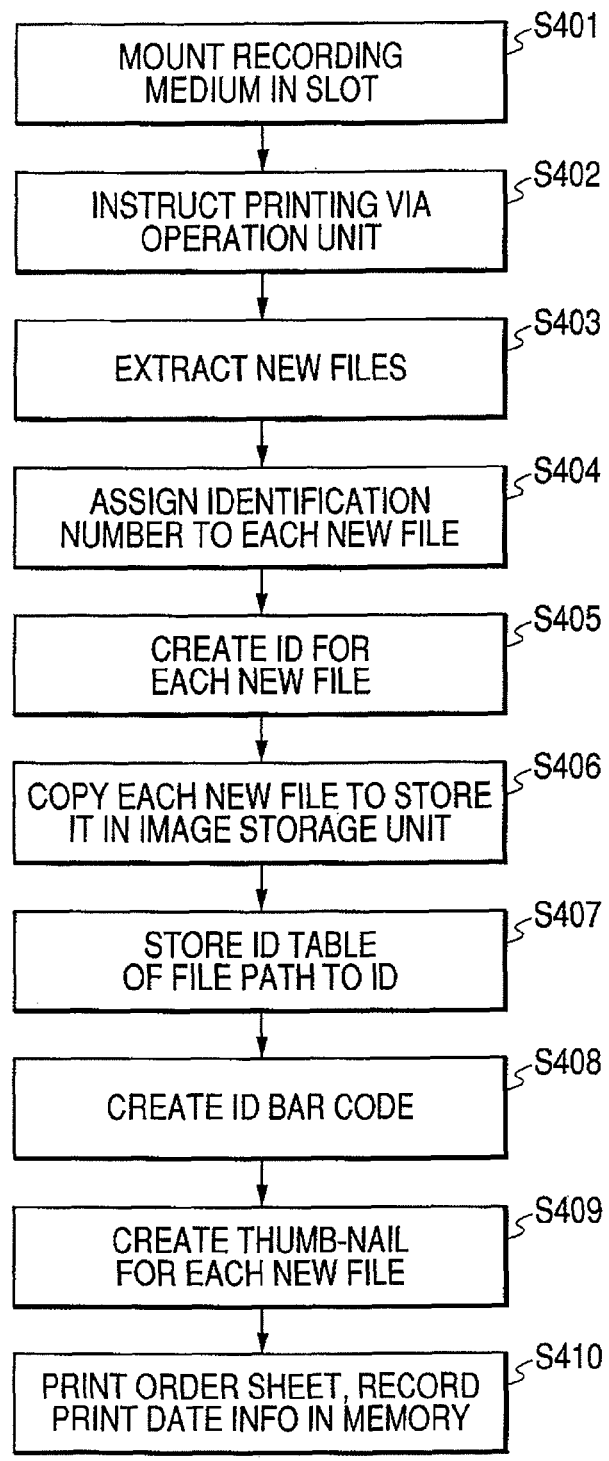
FIG. 4 is a flow chart showing the processing when the order sheet A is printed by the MFP adopting the present invention.

The flow chart of FIG. 4 shows the control when the order sheet A is printed from the image data recorded in the recording medium 6. The shown procedure, as the program of the CPU 3, is stored in advance in the ROM portion of the memory 2 (or HDD or the like constituting the image storage unit 5). Each step of FIG. 4 will hereinafter be described.

Step S401: the user mounts the recording medium 6 having photographed images recorded therein into the slot 7.

Step S402: the user instructs the printing of the order sheet A by the use of the operation unit 9.

Step S403: the CPU 3 examines the contents of the recording media 6, and extracts image files prepared when and after the order sheet A was printed at the last time (or there may be provided a user interface by which the user can one by one designate/extract image files to be outputted to the order sheet A this time).

Step S404: the CPU 3 assigns identification numbers (ones used as the identification numbers 203 of FIG. 2A) in succession from 1 to the respective photographed image files (new files) extracted at the step S403.

Step S405: the CPU 3 creates an ID (which is used for the ID bar code 201 of FIG. 2A) of the image regarding each of the image files (hereinafter referred to as the new image files) extracted to be outputted to the order sheet A. As this ID, one primary (or unique) for the image is created for each file by the use of the CRC (cyclic redundancy check) or the like of the file.

Step S406: the CPU 3 copies each of the new files to store it in the image storage unit 5 of the apparatus.

Step S407: the CPU 3 creates an ID table relating the file path of each new file copied and stored in the image storage unit 5 (the file name of the recording media on a file system) to the ID of that file, and stores it in the memory 2 of the apparatus.

Step S408: the CPU 3 creates a bar code (ID bar code) about each new file created at the step S405, from the ID of that file by a known technique. the ID bar code corresponds to ID at one to one, and that conversion between an ID bar code image and ID can be effected mutually.

Step S409: the CPU 3 creates a reduced image (thumb-nail) also for each new file.

Step S410: the CPU 3 arranges the identification numbers (203 in FIG. 2A) created at the step S404, the thumb-nails (202 in FIG. 2A) created at the step S409, and the ID bar codes (201 in FIG. 2A) created at the step S408 as shown in FIG. 2A, and prints them as the order sheet A. Also, at the same time, the date and time of the record-output (time information obtained from a system timer (not shown) or the like) of the order sheet A are recorded in the memory 2 (or another storage unit). The date and time of the record-output is used to compare them with the final change date and time information of the image file (or photographing information or the like recorded on the image file) when the new image file is extracted at the step S403 (however, to extract the new file by such a system that the date and time information of the image file is not recorded, there is necessary another unit such as recording the data base of the name of the image file outputted to the order sheet A).

As described above, in the present embodiment, the order sheet A premises its reuse, and (as a rule), it is adapted to record only what corresponds to the new image file and therefore, order sheets are not redundantly outputted, and such resources as paper and ink can be saved.

In the present embodiment, it is to be understood that the thumb-nail images printed on one order sheet are 12 sheets as shown in FIG. 2A. Thus, one of identification numbers 1 to 12 is allotted to each thumb-nail.

Also, discretely from the order sheet A, the order sheet B is printed by the user's operation. The order sheet B is such that as shown in FIG. 2B, the identification numbers (203) corresponding to the respective thumb-nails of the order sheet A, and the mark sheet column (205) which can designate the number of sheets to be printed, for each of the identification numbers, in a mark sheet form are arranged. The contents of this sheet do not depend on the contents of the order sheet A and therefore can be printed at any time and any number of times.

The size of the sum of the effective areas of the order sheet A and the order sheet B is predetermined so as to be smaller than a size readable by the image reading unit 1 (e.g. A4 or B4 size) so that as shown in FIG. 6, these two sheets can be read at a time by the image reading unit 1. FIG. 6 shows the manner of the reading of the order sheet A and the order sheet B (see a step S503 which will be described later), and in FIG. 6, an MFP 400 is an MFP having the control system of FIG. 3, and members corresponding to the blocks in FIG. 3 are given the same reference characters.

Figure 5:
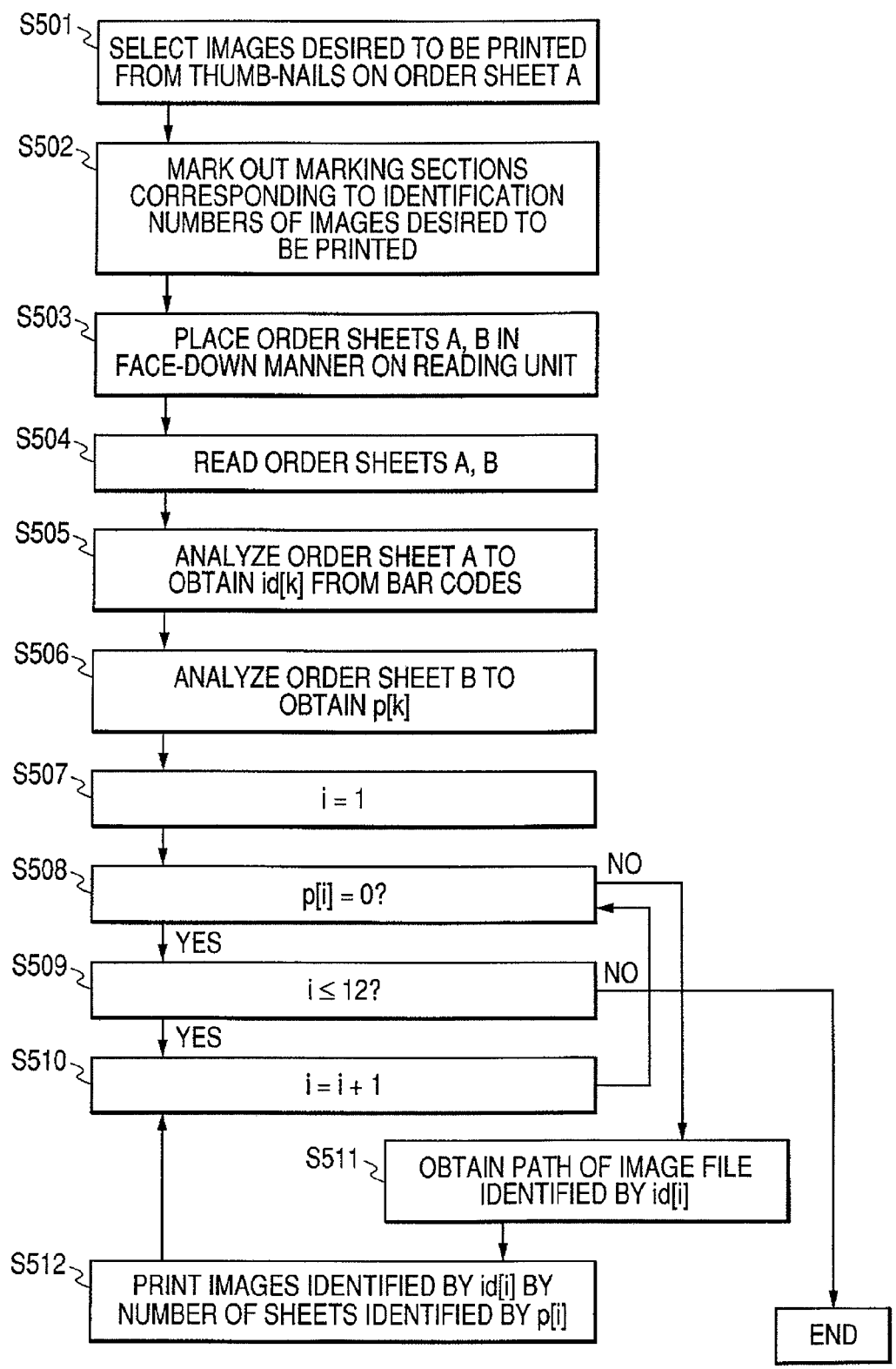
FIG. 5 is a flow chart showing the manner of print control effected in the present invention by the use of the order sheets A and B.

In reference to the flow chart of FIG. 5 the print control is described until the user selects a desired image from among the images having thumb-nails in the order sheet A printed by the apparatus of the present embodiment, and designates the number of sheets, and the apparatus performs the printing of the image. At this time, the order sheet A and the order sheet B are printed in advance.

Step S501: the user selects images he desires to print from the thumb-nails on the order sheet A.

Step S502: the user selects, from the order sheet B, sections having the same identification numbers as the images selected at the step S501, and as shown in FIG. 2C, marks out the mark portions of the number of sheets on which he desires to print the images selected at the step S501. Of course, marking is not effected regarding the images be does not intend to print. In the example shown in FIG. 2C, the user has designated so that the image of each of the identification numbers 5 and 9 may be printed by two sheets, and the image of the identification number 1 may be printed by one sheet.

Step S503: the user places the order sheet A and the order sheet B side by side on the image reading unit 1 of the apparatus as shown in FIG. 6 (on the image reading unit of such a flat bed type as shown, so that the image surface may face down).

Step S504: the user depresses a predetermined key (e.g. a key/button like "scan", which may of course be adapted to be subjected to an equivalent user's operation through a suitable GUI using the display unit 8), and the apparatus reads the order sheet A and the order sheet B at a time.

Step S505: the CPU 3 recognizes the bar code image (201) below each thumb-nail on the order sheet A portion of the image data obtained at the step S504, and obtains image ID: id[k] for each of identification numbers k ($1 \leq k \leq 12$). In the present embodiment, as described above, design is made such that the image ID is extracted from the order sheet A by the use of a bar code to thereby assign an image file and therefore, the process of assigning the image file can be carried out quickly and reliably.

Step S506: the apparatus recognizes the mark sheet section (205) for each identification number on the order sheet B portion of the image data obtained at the step S504, and obtains the number of sheets p[k] designated to be printed, for each identification number k. If marking is not effected about a certain identification number, it is to be understood that the number of prints p[k] for that identification number is 0.

Step S507: Initialization for carrying out the processing of a step S508 and subsequent steps about all of the identification numbers is effected. Here, an identification number counter i is initialized to 1.

Step S508: If the designated number of printed sheets (p[i]) indicated by the value of the identification number counter i is 0, shift is made to a step S509, and if it is not 0, shift is made to a step S511, where the printing of the pertinent image is effected (this will be described later).

Step S509: As long as the identification number counter i is $i \leq 12$, shift is made to a step S510, and if not so, the processing is terminated. This is a judgment for continuing loop processing as long as not all of the 12 sheets of images are processed.

Step S510: the identification number i is incremented by 1 (i=i+1) and return is made to the step S508.

Step S511: If at the step S508, the number of prints is not 0, the ID table created at the step S407 is searched for from ID: id[i] corresponding to the identification number counter i, to thereby obtain the file path of an image film corresponding to the identification number counter i.

Step S512: image files are read out from the path obtained at the step S511 by the number of sheets of p[i] obtained from the identification number counter i, and are record-outputted by the printer 4. Thereafter, shift is made to the step S510, where loop processing is continued.

By the above-described control procedure, the user can print desired images by a desired number of sheets by substantially the same simple operation as that for the conventional order sheet.

According to the present embodiment, unlike the conventional order sheet, the marking by the user is not done on the order sheet A (first order sheet) and therefore, the order sheet A can be repetitively reused, and the user reprints only the order sheet B and effects marking on the order sheet B (second order sheet), and then causes it to be read in together with the order sheet A by the apparatus, whereby images having thumb-nails can be easily designated on the same order sheet A as the last one, and can be printed again thereon. That is, the order sheet A can be used any number of times and therefore, even when the images accumulated in the image storage unit have become many, it becomes unnecessary for the user to print a huge number of order sheets including all of the accumulated images as thumb-nails each time the user desires to print any image, and this leads to the excellent effect that the user can quickly obtain the print output of an image he desires.

According to the present embodiment, if the thumb-nails of an image the user wants to print are only included in an order sheet A printed before, the order sheet A at the last time can be used over and over again by printing the order sheet B by only one sheet to thereby effect print designation. Also, when the images accumulated in the apparatus are numerous, it is unnecessary for the user to print an order sheet including all of the accumulated images as heretofore each time the user desires to print an image, and the saving of resources and time becomes possible.

Also, in the present embodiment, the order sheet B (second order sheet) does not include such information as directly designates the thumb-nails (or corresponding image files) on the order sheet A and therefore, the same order sheet B can be used in common for any order sheet A, and the order sheet B can be record-outputted at any necessary time and by any number of sheets.

While in the above-described embodiment, the correspondence between the thumb-nail on the order sheet A and the mark sheet section on the order sheet B is effected by only the positional relation therebetween, of course, the correspondence between the thumb-nail on the order sheet A and the mark sheet section on the order sheet B may be effected by another unit. For example, it will be enough if what thumb-nail on the order sheet A the mark sheet section on the order sheet B corresponds to can only be determined, and there is conceivable such a construction in which as information sufficient for this, bar code information or the like which assigns, for example, the position of the thumb-nail on the order sheet A is recorded on the order sheet B together with the mark sheet section, and in that case, the limitation of the position of the mark sheet section on the order sheet B can be loosened.

However, it is important to make such design that such information as directly designates the thumb-nail (or a corresponding image file) on the order sheet A is not printed on the order sheet B, whereby the universality of the order sheet is kept, and it becomes possible to use the same order sheet B in common for any order sheet A.

The present invention is not restricted by the name of a product such as an image processing apparatus (for example, the MFF (multifunction printer apparatus) in the foregoing embodiment) or the like, but can be carried out in various image processing apparatuses having an image reading unit and an image recording unit. The control program of the present invention can be stored in such media as the ROM of an image processing apparatus from the shipping of the image processing apparatus, and besides, can be supplied from various external storage media (a CDROM, a flexible disk, etc.) to these apparatuses, or can also be supplied from any server via a network.

This application claims priority from Japanese Patent Application No. 2004-359286 filed on Dec. 13, 2004, which is hereby incorporated by reference herein.

The invention claimed is:

1. An image processing method comprising:
    causing a printing apparatus to print a first order sheet including specifying information for specifying each of images stored in a memory, and to print a second order sheet for designating the images specified by the first order sheet;
    acquiring a first read image obtained by reading, by a reading apparatus, said first order sheet printed by the printing apparatus, and a second read image obtained by reading, by the reading apparatus, said second order sheet printed by the printing apparatus;
    determining a designated position on the second order sheet where a user has designated, based on the acquired second read image, and determining a corresponding position on the first order sheet corresponding to the determined designated position on the second order sheet, based on the determined designated position on the second order sheet and the first read image;
    selecting the specifying information which is included in the first read image and laid out at the determined corresponding position on the first order sheet;
    specifying an image corresponding to the selected specifying information from the images stored in the memory; and
    outputting the specified image, stored in the memory.

2. An image processing method according to claim 1, wherein said specifying information is printed in the form of a code on said first order sheet.

3. An image processing method according to claim 1, wherein the specified image is output to a printing apparatus, and the output image is printed by the printing apparatus.

4. An image processing method according to claim 1, wherein the specifying information for specifying any image stored in a memory, is not printed on the second order sheet.

5. An image processing method according to claim 1, wherein the specifying information is ID information for specifying image data stored in the memory.

6. An image processing method according to claim 1, wherein the first order sheet includes the images stored in the memory, the images being laid out in the first order sheet at a position corresponding to the specifying information corresponding to each of the images.

7. An image processing method according to claim 6, wherein if a plurality of the first order sheets are printed by the printing apparatus, images stored in the memory are printed onto the plurality of the first order sheets without redundant printing of images corresponding to the plurality of images on the first order sheets.

8. An image processing method according to claim 7, wherein images newer than the date and time of the last printing of said first order sheet are printed onto the other first order sheet.

9. An image processing apparatus for carrying out an image processing method, comprising:
    a memory that stores code of a computer program; and
    at least one processor that executes the code of the computer program to cause the image processing apparatus to perform the steps of:
    causing a printing apparatus to print a first order sheet including specifying information for specifying each of images stored in a memory, and to print a second order sheet for designating the images specified by the first order sheet;
    acquiring a first read image obtained by reading, by a reading apparatus, said first order sheet printed by the printing apparatus, and a second read image obtained by reading, by the reading apparatus, said second order sheet printed by the printing apparatus;
    determining a designated position on the second order sheet where a user has designated, based on the acquired second read image, and determining a corresponding position on the first order sheet corresponding to the determined designated position on the second order sheet, based on the determined designated position on the second order sheet and the first read image;
    selecting the specifying information which is included in the first read image and laid out at the determined corresponding position on the first order sheet;
    specifying an image corresponding to the selected specifying information from the images stored in the memory; and
    outputting the specified image, stored in the memory.

10. A non-transitory computer-readable medium which stores a computer-executable control program configured to execute an image processing method that causes a computer to perform the steps of:
    causing a printing apparatus to print a first order sheet including specifying information for specifying each of images stored in a memory, and to print a second order sheet for designating the images specified by the first order sheet;

acquiring a first read image obtained by reading, by a reading apparatus, said first order sheet printed by the printing apparatus, and a second read image obtained by reading, by the reading apparatus, said second order sheet printed by the printing apparatus;

determining a designated position on the second order sheet where a user has designated, based on the acquired second read image, and determining a corresponding position on the first order sheet corresponding to the determined designated position on the second order sheet, based on the determined designated position on the second order sheet and the first read image;

selecting the specifying information which is included in the first read image and laid out at the determined corresponding position on the first order sheet;

specifying an image corresponding to the selected specifying information from the images stored in the memory; and outputting the specified image, stored in the memory.

* * * * *